June 18, 1957 K. BRELAND 2,796,044
TRAINED ANIMAL FEEDER
Filed Jan. 9, 1953 3 Sheets-Sheet 1
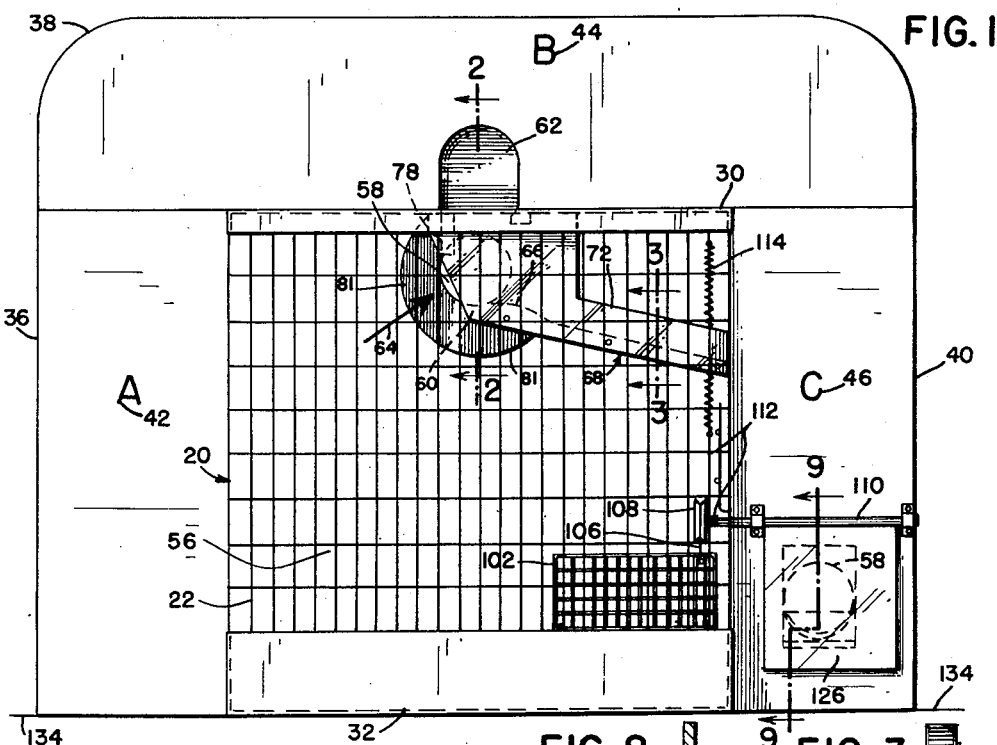
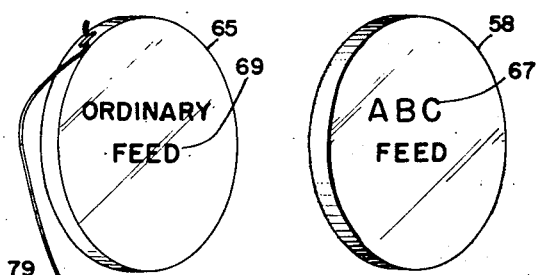
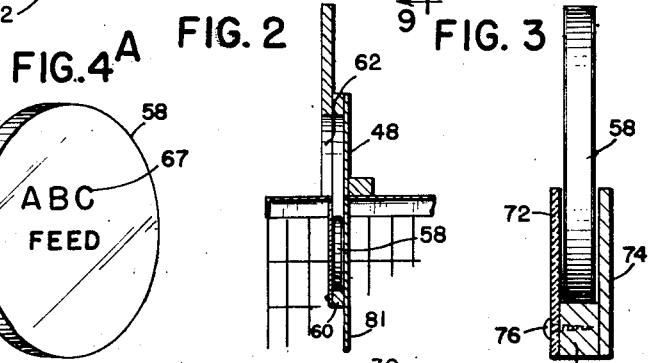
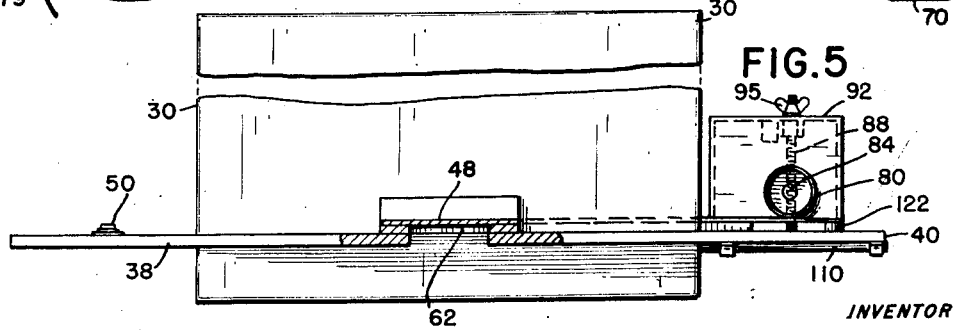
INVENTOR
KELLER BRELAND
BY William C. Stueber ATTORNEY

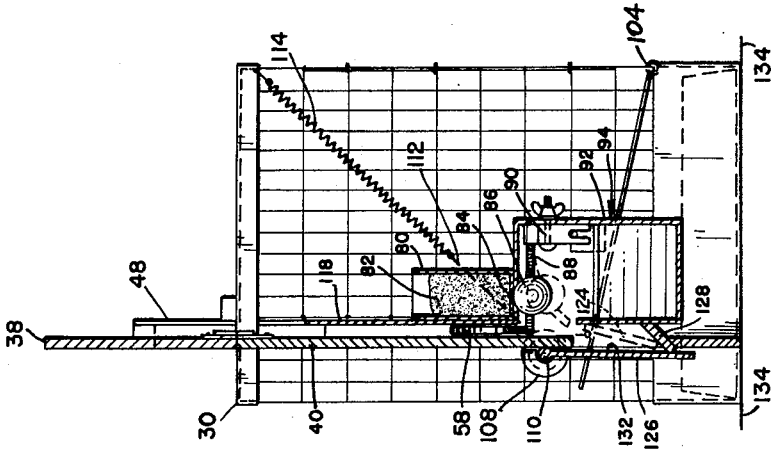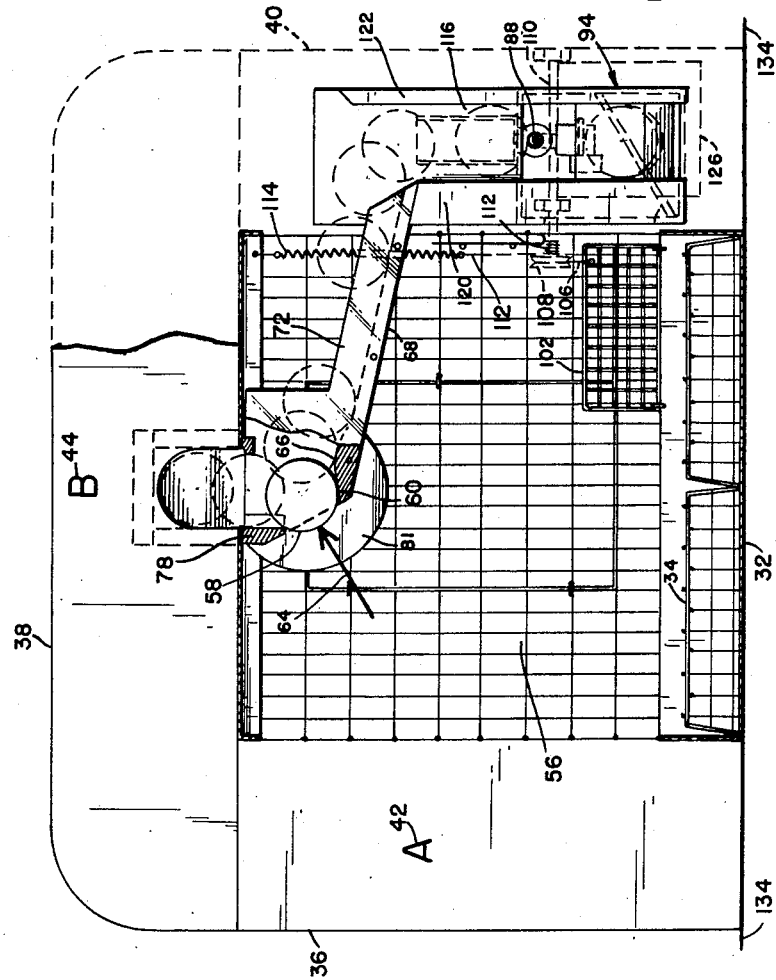

June 18, 1957      K. BRELAND      2,796,044
TRAINED ANIMAL FEEDER
Filed Jan. 9, 1953      3 Sheets-Sheet 3
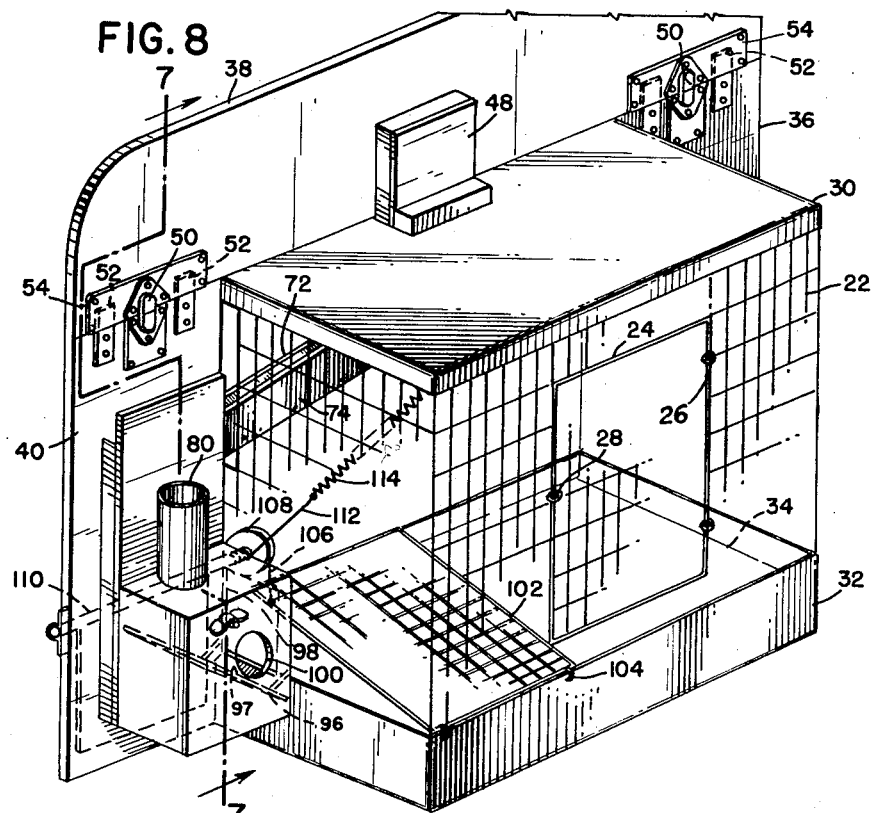
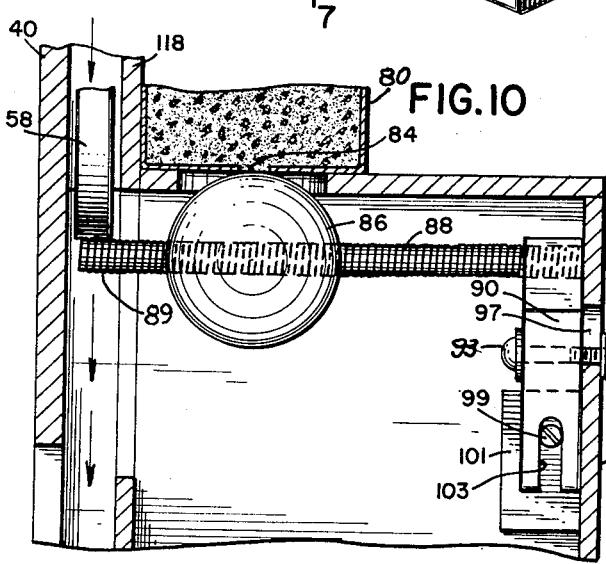
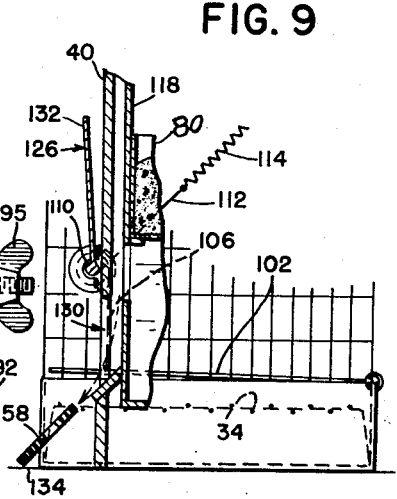
INVENTOR
KELLER BRELAND
BY William C. Stueber, ATTORNEY United States Patent Office 2,796,044
Patented June 18, 1957

2,796,044

TRAINED ANIMAL FEEDER

Keller Breland, Hot Springs, Ark., assignor to General Mills, Inc., a corporation of Delaware Application January 9, 1953, Serial No. 330,457

9 Claims. (Cl. 119—29)

The present invention relates to improvements in and devices for dispensing small quantities of feed to a trained animal and more generally to a method and mechanism which may be used for indicating to an observer an animal's preference for a certain type of feed by automatically dispensing a small quantity of the feed in response to a specific performance of an animal.

In the science of training animals, it is known that animals may be conditioned to respond to objects having a certain characteristic, such as a color, shape, odor, etc. Through training, the animal will learn to rapidly respond to an object having a certain characteristic and ignore other objects having other characteristics, although the selected object may be similar to the other object in many respects. Utilizing these facts, an animal may be taught to select objects having a certain color in preference to other objects having different colors, although the objects are the same size and shape. If the object having the color to which the animal is conditioned to make selection has printing on its surface conveying a certain message, the animal will still select the object responding only to the color and the printing will make no difference to it. To the layman observer, however, the animal may appear to select the object because of the printing on the surface giving the impression that it can read and is making its selection on the basis of the message conveyed by the printing. These principles are utilized in the present invention to present a mechanism which may be used for various purposes, such as advertising a certain brand of a commodity, or it may be used for the public's amusement or for its edification.

If the device is used to display and promote a specific brand of animal feed, then the printing on the object that the animal selects will tout the specific feed brand. In order to indicate that the animal's selection is a manifestation of a preference for the specific brand of feed, the animal may be rewarded by being dispensed a small quantity of the feed. This indicates to the public the animal's actual preference for the feed and enhances the animal's conditioning to respond to the object having a certain color characteristic.

Accordingly, it is an object of the present invention to provide a mechanism in which a trained animal may perform by selecting an object to which the animal is conditioned and which has a special distinguishing characteristic, such as a color, the animal receiving a small quantity of feed as a reward for the specific act of selecting the object.

It is a further object of the invention to provide a feed dispensing device which will serve the above purposes in that it may be operated automatically and solely by the action of the animal and will dispense feed in small uniform quantities from a container.

It is another object of the invention to provide a feed dispensing mechanism for use with the above device which will dispense small uniform quantities of feed from a large container dropping the feed to a surface below the container without supporting any of the feed on its exposed surfaces to attract the animal to the feed in the container.

Another object of the invention is to provide a device for the amusement and edification of the public in which a trained animal performs to select one of a plurality of objects which has printing thereon advertising a certain brand of feed and, in response to the animal's selection, the device will automatically dispense a rewarding portion of feed. The animal in obtaining the feed operates a second automatic device which returns the previously selected object to the operator and simultaneously reveals a concealed sign further explaining the virtues of the specific feed.

A still further object of the invention is to provide an exceedingly simple device which will accomplish the above objectives and will operate entirely automatically without the provision of electrical or extraneous mechanical power and which will, when manually prepared, operate solely due to the actions and efforts of the animal involved.

Other objects and advantages will become apparent in the disclosure of the invention in the specification and claims, taken in connection with the drawings in which Figure 1 is a front elevational view of the cage in which the animal performs to operate the automatic mechanism;

Fig. 2 is a sectional view taken along line 2—2 of Fig. 1, illustrating the apparatus for unstably supporting the disk before its engagement by the animal;

Fig. 3 is an enlarged sectional view taken along line 3—3 of Fig. 1, illustrating the disk which has been selected by the animal and which is rolling down the inclined track;

Fig. 4 is a perspective view of a second disk which the animal is not conditioned to select while Fig. 4A illustrates in perspective the disk which the animal will select;

Fig. 5 is a plane view, partially in section, showing the mechanism with which the animal performs;

Fig. 6 is a front elevational view of the apparatus in which the animal performs with portions of the device broken away to illustrate the inner workings of the mechanism;

Fig. 7 is a sectional view taken along line 7—7 of Fig. 8, illustrating the details of the feed release mechanism;

Fig. 8 is a perspective view taken from the rear of the device;

Fig. 9 is an enlarged view of a portion of Fig. 7 showing the display door in raised position; and Fig. 10 is an enlarged vertical section taken through the valve which controls the flow of feed from the feed container and is a greatly enlarged detail of that portion of Fig. 7.

In the mechanism shown, which is the preferred embodiment of the invention, a cage 20 is provided (Figs. 1, 5, 6, 7 and 8) having suitable bars or wire grating or screening 22 to house the animal which is to perform and operate the mechanism. A cage of any type suitable to the particular animal used may be provided and various animals may be trained to perform the functions required in the operation of the device. For purposes of illustration only, the animal which operates the preferred embodiment will be described as a chicken, although it is to be understood that the invention is not to be restricted to use with this one type of animal. It has been found that birds, such as chickens, are advantageous because they are easily housed and cared for and are relatively docile and easily trained.

At the rear of the cage (Fig. 8) is a door 24 hingedly attached to swing about its hinged edge 26 for opening and closing to admit and remove the chicken. A latch 28 is provided to secure the door when the animal is inside, The screening 22, which permits the observer or spectator to see the animal, is affixed at its upper end to the roof 30 of the cage and at its lower end to a base 32. The base has an inner floor 34 on which the chicken stands.

The apparatus may have various uses, such as for training the animals or for animal research in the study of animal behavior, wherein it is often desired to observe an animal's actions to establish his learning pattern, or the like, by rewarding a specific performance with a gift of a small quantity of feed. If the apparatus is to be used as an advertising device, certain portions of the operating mechanism should be hidden from the observer and display and advertising material will be printed on the cage. For these purposes extension boards 36, 38 and 40 extend flush with the front of the cage from the sides and from the top. Display material conveying information to the observer may appear on the face of the boards as illustrated by the letters A, B and C at the points 42, 44 and 46. The top display board 38 (Fig. 8) has a bracket 48 attached to its rear and rests on the top 30 of the cage to support the board. The side display boards 36 and 40 are supported from the top display board by any suitable means, such as a hasp 50. Tongues 52 are secured to the side display boards to slide into the slots on a member 54 which is secured to the top display board. The side boards may be further secured to the sides of the cage, if it is desired.

The audience observes the cage, as it appears in Fig. 1, with a chicken standing at the left side of the cage approximately at the position 56. The chicken will stand at that position in order to see the disk 58 which rests on the support 60 which is mounted near the front of the cage. The chicken will stand slightly to the left of the center of the cage facing forwardly so that it will also be facing the observer. Chickens will assume various positions to see and peck at the disk 58, although the cage is constructed so that the chicken must be off the platform 102 to peck the disk. The importance of having the platform free will become clear with the description of the function of the platform later in the specification.

From previous training, either with the present apparatus or other similar mechanism, the chicken has been taught to peck against a disk in the position 58 which has a certain color. This training may be accomplished in ways well known to the animal training field, such as by rewarding the bird with a portion of feed each time it performs the correct action. After thorough training, the bird will learn that pecking against the disk 58 will obtain for it a reward of feed. It will also learn that if the disk 58 is of the wrong color, the reward of feed is not obtained. Therefore, the bird wil ignore al disks except those of the proper color which obtain the feed.

To position the disk 58 on the support 60, as shown in Fig. 1, it is manually inserted into the slot 62 and dropped down to the support 60. The insertion slot is shown in detail in Fig. 2.

A plurality of disks is provided being of various colors and only one disk is of the color that the chicken will select. Two disks 65 and 58 are shown in Figs. 4 and 4A and, for purposes of this application, it will be assumed that the chicken has been conditioned to respond to select a disk that has a black edge and ignore disks of other colors. When the disk 58 of Fig. 4A having a black edge is placed before it, it will then drive its bill against the black edge of the disk, whereas if the white disk 65 is placed before it, the chicken will ignore it. Thus, if the black disk is dropped in the slot 62 to rest on the support 60, the chicken will immediately drive its bill against the black edge of the disk engaging it and pushing it to the right, as shown by the arrow 64 (Figs. 1 and 6).

The support 60 is unstable in that a small amount of pressure from the left will cause the disk to roll over the incline 66 and proceed to roll by the force of gravity down the track 68, moving as illustrated by the succession of dotted line figures of Fig. 6.

The track 68 is inclined downwardly so that the disk readily rolls downhill to the right. The track is formed of a base member 70 (Fig. 3) which is slightly wider than the disk. To the sides of the base member are attached front and rear side railings 72 and 74 which are suitably attached to the base by screws 76. The forward railing 72 may be of a clear plastic material so that the position of the disk may at all times be observed by the public.

It wil be noted that the top of the guide track remains unclosed. If the mechanism is to be used for basically training the chicken, the white disk can be manually intercepted and the black disk permitted to roll down the incline. By rolling down the incline, the black disk releases a quantity of feed to the chicken and it will soon learn that choosing the white disk does not obtain a reward, whereas the black disk does.

Before the disk rolls down the incline, it is positioned on the unstable support 60 and is prevented from being accidentally rolled off the support to the left by a stop 78. If the chicken is conditioned to peck against a member which is black, the situation may be improved by painting the surrounding shield 81, support 60 and stop 78 white so that the chicken will more easily see the black-edged disk and will be less likely to select the white disk 65 when it is inserted into the slot. The shield 81 is secured to the track behind the disk, so that the chicken will have to reach around it and deliver a blow in pecking the disk, which will be perpendicular to the axis of the disk and thus easily cause it to roll off the support.

If the white disk is dropped into the slot 62, the chicken will ignore it. It can be removed by lifting it out by the string 79 which is attached to it. Replacing it with the black disk will then cause the chicken to engage the black disk with its bill to start it down the incline 68.

It will thus be seen that the disk having weight has an energy potential which is released by the chicken's pecking and dislodging it from its support.

If the device is to be used as an advertising medium, the black disk 58 may have advertising 67 printed on its face which gives the name of the product. In this case, this will probably be the chicken feed to be advertised. The white disk may have printed on its face the words "ordinary feed," as shown at 69, or the name of a different feed which the observer is to be shown that the bird considers less desirable than the feed name printed on the black disk. To the observer, whether he be layman or have knowledge of the bird's learned propensities, it will appear that the chicken has selected the disk because of the printing on the face. In the mind of the observer, the disk to which the chicken is conditioned is then identified as a disk representing a certain type of feed to be advertised and the selection of the disk by the chicken will indicate to him that the chicken has selected that type of feed.

To reward the chicken for pecking at the disk, a small portion of feed is dispensed to it, as shown in Figs. 5, 6, 7 and 10. The container 80 is provided holding a quantity of feed 82. In the bottom of the container is a hole 84 through which small portions of feed are dispensed and a valve member 86, having a spherical shape, is supported against the hole to prevent escape of feed. To support the valve against the hole a cylindrical spiral spring 88 extends through the valve member. The valve support spring 88 is secured at its base in a block 90 which is held against the side wall 92 of the feeding compartment 94 by a bolt 93 with a wing nut 95. The block 90 is vertically adjustable to control the amount of feed discharged when the spring end is struck by the disk 58, see Fig. 10. To adjust the block the bolt slides in a slot 97. A pin 99, protruding from a fixed block 101, extends in a slot 103 in the support block and helps keep it in position during operation.

It is to be noted that the spherical valve and the supporting spring both have rounded surfaces on their upward faces so that when feed drops from the container 80, none of the feed will rest on the surface but will slide off. This prevents any small deposits of feed from sticking on the valve rather than dropping downwardly and prevents the chicken from being attracted to any feed which may rest on the valve.

The valve assembly may be easily and cheaply constructed of a small rubber ball which has a resilient surface and serves as an excellent valve member. The support for the valve may be an inexpensive spring which can be connected to the valve by merely boring a hole through the center of the rubber ball and inserting the spring therethrough. The feed container 80 may be of a simple tin can with a circular hole cut in the bottom.

The feeding compartment 94 has an inclined floor 96 (Fig. 8) upon which the feed falls when it drops from the container 80. The feed slides down the inclined floor to a V-shaped bottom 97 adjacent the opening 98 through which the chicken obtains the feed. Another opening 100 in a side wall of the container admits light and air to the feed compartment.

After the chicken has dislodged the disk 58 and it rolls down the incline, it drops off the end and strikes the end 89 of the spring 88, as shown in detail in Fig. 10, and the ball moves away from the hole as shown in the dotted line position of Fig. 7. The disk is guided so that it will fall directly downwardly, being bounded at the front (Figs. 6 and 7) by the display board 40 at the rear by the vertical panel 118, on its left in Fig. 6 by the member 120 which also supports the end of the incline 68, and on its right by a vertical spacing member 122.

As the disk strikes and passes the spring 88, it temporarily moves the spring downwardly and moves the ball valve 86 away from the opening 84 to permit a small quantity of feed to drop through the hole. As the disk passes the spring, it springs back into its original position to again hold the ball against the opening. The disk 58 finally comes to rest in the dotted line position 124, Fig. 7, behind the display door 126, resting on the shelf 128 on the bottom of the display door opening 130.

Referring to Fig. 6, it will be noted that the chicken must stand approximately in the position 56 in order to see the disk 58, and has between it and the feed compartment 94 a wire platform 102. In order to get from its position to the feed compartment, it must step on the wire platform 102. The weight of the chicken carries the platform downwardly to perform a specific function.

The platform 102 (Figs. 7 and 8) is hingedly mounted at 104 near the floor of the cage and is inclined upwardly so that the chicken standing on the platform will cause it to pivot downwardly. The platform pivoting downwardly will pull down on a line 106 passing over a sheave 108 on a shaft 110, thus rotating the sheave and shaft. Another line 112 is wound around the shaft in a direction counter to the line 106 so that tension on the line 112 will act counter to the weight on the platform 102. Tension is placed on the line 112 through a spring 114 which is secured between the end of the line and the top of the cage. This spring helps to keep the platform in an elevated position and will return it to its normal position after the chicken steps off the platform.

The display door 126 (Figs. 1, 7 and 9) is carried on the shaft 110 and has printing on its inward side 132. This printing will convey a message to the observer and is normally obscured when the door is in the down position as shown in Fig. 7. When, however, the chicken steps on the platform 102, the shaft 110 is pivoted to carry the display door upwardly, revealing the printing matter to the observer, as shown in Fig. 9. This also opens the display opening 130, permitting the disk 58 to drop to the surface 134 on which the apparatus rests.

The action of the chicken moving to get the feed has thus lifted the display door to convey further information to the observer. In an advertising device, the display door may indicate to the observer that the chicken has chosen the feed of its choice and extol some of the virtues of the feed. The maneuver of the chicken in getting its feed and opening the display door also drops down the cylindrical disk where it is manually retrieved and can again be placed in the slot at the top of the mechanism. The chicken after eating its feed moves back to its position at 56 to watch for the insertion of another black-edged disk so that it might repeat its performance and again obtain for itself a portion of feed. In operation, the device acts as a training apparatus because with each reward of feed the animal becomes more thoroughly trained. It will be recognized that the mechanism described may be used as a cage for training a chicken. To teach the chicken to pick only the black-edged disk, the white-edged disk can be manually intercepted as it rolls down the incline. The black disk will be permitted to drop off the end of the incline and dispense feed to the chicken and the chicken will soon learn to distinguish between the two.

In the art of training an animal for a performance such as herein described, the training process is known as "extinction." In the present mechanism, early in training the chicken it may strike at the white disk almost as often as at the black. However, the training is so conducted that this response to the white disk is never reinforced (rewarded) and gradually the response to the white will weaken, i. e., occur less and less often, until it is for all practical purposes eliminated. In the course of training, the trainer will present the black disk two or three times making certain that the response of pecking this one is rewarded. He will then present the white disk, holding this in place so that it cannot operate the feeder. After the chicken has taken a few pecks at the disk and has not been rewarded, the black disk will again be presented and this one will, of course, be permitted to roll down the track to reward the chicken. In the course of training there is a gradual diminishing of the response to the white disk until response of the chicken is given only to the black disk and the chicken is then sufficiently trained to perform. It will be seen that the present cage presents an excellent apparatus for this method of training as well as an apparatus well adapted for other objectives herein set forth.

Thus it will be seen I have provided an apparatus which accomplishes the objectives heretofore set forth and which, although having been described primarily as an advertising device, is susceptible of a great many uses. The combination of elements which make up the machine provide a novel way of dispensing small quantities of feed to a chicken as a reward for the specific performance of its striking the disk which rolls down the incline. It will be recognized that objects other than a disk may be used to operate the feed release valve and that various other changes may be made in the mechanism within the scope of the invention.

The invention has disclosed a new method of dispensing quantities of feed to an animal, utilizing the possibilities of pre-training the animal to perform a specific action. The mechanism presents a simple device which requires no outside motive force and has simple operating parts which will not easily get out of order.

I have, in the drawings and specification, presented a detailed disclosure of the preferred embodiment of my invention, but it is to be understood that as the invention is susceptible of modifications, structural changes and various applications of use within the spirit and scope of the invention, I do not intend to limit the invention to the specific form disclosed but intend to cover all modifications, changes and alternative constructions and methods falling within the scope of the principles taught by my invention.

I claim as my invention:

1. A device for automatically dispensing small quantities of feed to a trained animal as a reward for a specfic performance to thereby more thoroughly train the animal, the device comprising a container for holding a quantity of feed to be dispensed in small rewarding quantities to the animal, the container having a bottom opening, a valve member normally positioned over the opening, resilient means positioned externally of said container to hold the valve member upwardly against the opening, all upwardly facing surfaces of the valve member and holding member being inclined to prevent the accumulation of feed thereon preventing attracting the animal to the valve member, and means operated by the animal and operatively associated with the holding means to briefly open the valve to drop a small amount of feed from the container.

2. A device for automatically dispensing small quantities of feed to a trained animal as a reward for a specific performance, the device comprising a container for holding a quantity of feed to be dispensed in rewarding portions to the animal, an opening in the bottom of the container, a valve operatively associated with the opening for closing said opening to prevent escape of the feed, the valve being spherically shaped and formed of a resilient material, a cylindrical spring extending laterally through the center of the valve and resiliently supporting the valve against the hole, and a valve opening means positioned to be engaged by the animal to cause it to strike the end of the cylindrical spring and cause the valve to be temporarily dislocated from the hole with a result in discharge of a small portion of feed to reward the animal for its act of engaging the feed releasing means, the resilient nature and curved surface of the spring and valve member preventing the deposits of feed from remaining on the upper surfaces.

3. A device for automatically dispensing small quantities of feed to a trained animal as a reward for a specific performance, the device comprising a feed container having an opening through which small rewarding portions of feed are dispensed to the animal, a valve member normally positioned over the opening to prevent the escape of feed, a resilient valve supporting member normally urging the valve member against the opening and having a projection extending beyond the valve, an inclined track positioned for the descent of an object against the projection of the valve support member, and a circular feed release member positionable at the top of the inclined track to be engaged by the animal to cause its gravitational descent down the track whereupon it strikes the projection valve support member to temporarily dislodge the valve from the container hole and release a small portion of feed as a reward to the animal for his act of engaging the feed release member.

4. A device for automatically dispensing small quantities of feed to a trained animal as a reward for a specific performance, the device comprising a container for holding an amount of feed to be dispensed in small rewarding portions to the animal, a valve in the container for releasing said portion being normally positioned over the hole in the container, means for holding the valve in nondispensing position over the hole and being operable to temporarily displace the valve from the hole and permit a small quantity of feed to pass through the hole, a circular member capable of engaging the valve support member to cause it to dislodge the valve from the hole to drop a quantity of feed, means associated with the valve holding means to guide the circular member in a path of travel directing against the valve holding member, and a recess positioned at the top of the guide means in which the circular member normally remains at rest when manually positioned there and from which the circular member may be disengaged by a small amount of force exerted by the animal seeking to release the feed.

5. A device for automatically dispensing small quantities of feed to a trained animal as a reward for a specific performance, the device comprising a container for holding an amount of feed to be dispensed in small rewarding proportions to the animal, means associated with the container for releasing small portions when actuated, first and second feed release actuating members adapted for selective engagement with the feed release means to cause it to drop a portion of feed from the container, guide means to direct the feed release members to engagement with the feed release means when released to drop by gravity, the first and second feed release members being of different colors and the animal being conditioned to engage the first feed release means because of its appearance but not to engage the second feed release means, a support for unstably holding the feed release actuating means which will permit them to drop against the feed release means when engaged by the animal, thereby dispensing a small portion of feed to reward the animal for engaging the first feed release actuating means, the animal ignoring the second feed release means because of its color to which the animal is unconditioned.

6. A device for automatically dispensing small quantities of feed to a trained animal as a reward for a specific performance, the device comprising a container for holding a quantity of feed to be dispensed in rewarding portions to the animal, an opening in the container, a valve operatively associated with the opening for closing said opening to prevent the escape of feed, means engaged by the animal and operatively associated with the valve to open it to disepense a quantity of feed to reward the animal for engaging said means, and an adjustment apparatus associated with said valve to control its opening and adjust the amount of feed dispensed to the animal with each engagement of the means.

7. A device for automatically dispensing small quantities of feed to a trained animal as a reward for a specific performance, the device comprising a container for holding a quantity of feed to be dispensed in rewarding portions to the animal, an opening in the container bottom, a valve for closing said opening to prevent the escape of feed, a spring secured to a suitable support and connected to the valve biasing it against said opening, a projection extending laterally from the valve, and means positioned above said projection and operable by an animal to move downwardly striking the projection to temporarily move the valve away from the opening against the action of the spring to briefly uncover the opening and discharge an amount of feed from the container for the animal.

8. A device for automatically dispensing small quantities of feed to a trained animal as a reward for a specific performance, the device comprising a container for holding a quantity of feed to be dispensed in rewarding portions to the animal, said container having a bottom opening, a valve located at the bottom of the container for closing said opening to prevent the escape of feed, said valve having a soft resilient upper surface for engaging the container around the opening to provide a tight seal and damp the engagement of the valve with the container, spring means biasing the valve upwardly against the container, valve operating means projecting laterally beyond the side of the container and actuated from above to temporarily uncover said opening to drop feed to the animal, and valve adjustment means adjustably positioned to limit the travel of said valve operating means thereby limiting the distance said valve moves away from the container to control the amount of feed dispensed each time the valve is opened.

9. A device for automatically dispensing small quantities of feed to a trained animal as a reward for a specific performance, the device comprising a container for holding a quantity of feed to be dispensed in rewarding portions to the animal, an opening in the bottom of the container, a valve operatively associated with the opening for closing said opening to prevent escape of the feed, the valve being spherically shaped and formed of a resilient material, a cylindrical spring extending laterally through the center of the valve and resiliently supporting the valve against the opening, means supporting one end of said spring at a point displaced laterally from the valve, and the other end of said spring projecting beyond the opposite side of the valve and constituting a resiliently movable valve-opening means, the resilient nature and curved upper surfaces of the spring and valve preventing retention of feed deposits on said surfaces.

References Cited in the file of this patent

UNITED STATES PATENTS

| | | |
|---|---|---|
| 1,131,015 | Sultzbaugh | Mar. 9, 1915 |
| 1,199,328 | Wyckeart | Sept. 26, 1916 |
| 1,268,869 | Morrow | June 11, 1918 |
| 1,563,366 | Honegger | Dec. 1, 1925 |
| 1,911,250 | Stover | May 30, 1933 |
| 2,060,411 | Brace | Nov. 10, 1936 |

FOREIGN PATENTS

| | | |
|---|---|---|
| 250,875 | Great Britain | Apr. 22, 1926 |
| 409,913 | Great Britain | May 10, 1934 |